(12) United States Patent
Zheng (10) Patent No.: US 9,599,850 B2
(45) Date of Patent: Mar. 21, 2017

(54) LIQUID CRYSTAL DISPLAY PANEL FOR CURVED SCREEN

(71) Applicant: Shenzhen China Star Optoelectronics Technology Co., Ltd., Guangdong (CN)

(72) Inventor: Hua Zheng, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 169 days.

(21) Appl. No.: 14/407,185

(22) PCT Filed: Nov. 14, 2014

(86) PCT No.: PCT/CN2014/091060
§ 371 (c)(1),
(2) Date: Dec. 11, 2014

(87) PCT Pub. No.: WO2016/074205
PCT Pub. Date: May 19, 2016

(65) Prior Publication Data
US 2016/0131948 A1 May 12, 2016

(30) Foreign Application Priority Data
Nov. 10, 2014 (CN) .......................... 2014 1 0627758

(51) Int. Cl.
*G02F 1/1335* (2006.01)
*G02F 1/1333* (2006.01)
*G02F 1/1343* (2006.01)

(52) U.S. Cl.
CPC .. *G02F 1/133512* (2013.01); *G02F 1/133305* (2013.01); *G02F 2001/134345* (2013.01)

(58) Field of Classification Search
None
See application file for complete search history.

(56) References Cited

U.S. PATENT DOCUMENTS

2009/0091681 A1  4/2009  Nishizawa et al.
2014/0320543 A1* 10/2014  Oh ........................ H01L 27/326
                                                          345/690

(Continued)

FOREIGN PATENT DOCUMENTS

CN          104035224         9/2014
CN          104330910         2/2015

*Primary Examiner* — Dung Nguyen
*Assistant Examiner* — Shan Liu (57) ABSTRACT

An LCD panel applied to a curved screen includes display sections and a black matrix layer. The black matrix layer is used for adjusting an area of the primary sub-pixel and an area of the secondary sub-pixel in each of display section, so that an area ratio of the secondary sub-pixel to the primary sub-pixel in the first display section equals to an area ratio of the secondary sub-pixel to the primary sub-pixel in the central display section, an area ratio of the secondary sub-pixel to the primary sub-pixel in the second display section is greater than that of the secondary sub-pixel to the primary sub-pixel in the first display section, an area of the primary sub-pixel in the central display section is lower than that of the primary sub-pixel in the first display section. Therefore, brightness and quality of the curved screen on image display are improved.

17 Claims, 5 Drawing Sheets

(56) References Cited

U.S. PATENT DOCUMENTS

2016/0097950 A1\* 4/2016 Chang ............... G02F 1/133512
349/43
2016/0116811 A1\* 4/2016 Zheng ............... G02F 1/133512
349/38

\* cited by examiner

LIQUID CRYSTAL DISPLAY PANEL FOR CURVED SCREEN

RELATED APPLICATIONS

This application is a National Phase of PCT Patent Application No. PCT/CN2014/091060 having International filing date of Nov. 14, 2014, which claims the benefit of priority of Chinese Patent Application No. 201410627758.8 filed on Nov. 10, 2014. The contents of the above applications are all incorporated by reference as if fully set forth herein in their entirety.

BACKGROUND OF THE INVENTION

1. Field of the Invention

The present invention relates to a liquid crystal display (LCD) panel, and more particularly, to an LCD panel capable of showing good images via a high quality curved screen which is improved by adjusting the area of a sharing capacitance of a pixel in each display section.

2. Description of the Prior Art

The size of display screens becomes larger and larger. A traditional flat screen needs larger space for a larger display screen, which leads to smaller space for a curved screen. Besides, curved screens have the effect of image disclosure so the effect of screen display on the curved screens is better than on traditional flat screens. Consequently, the curved screens apply more and more widely.

Figure 1:
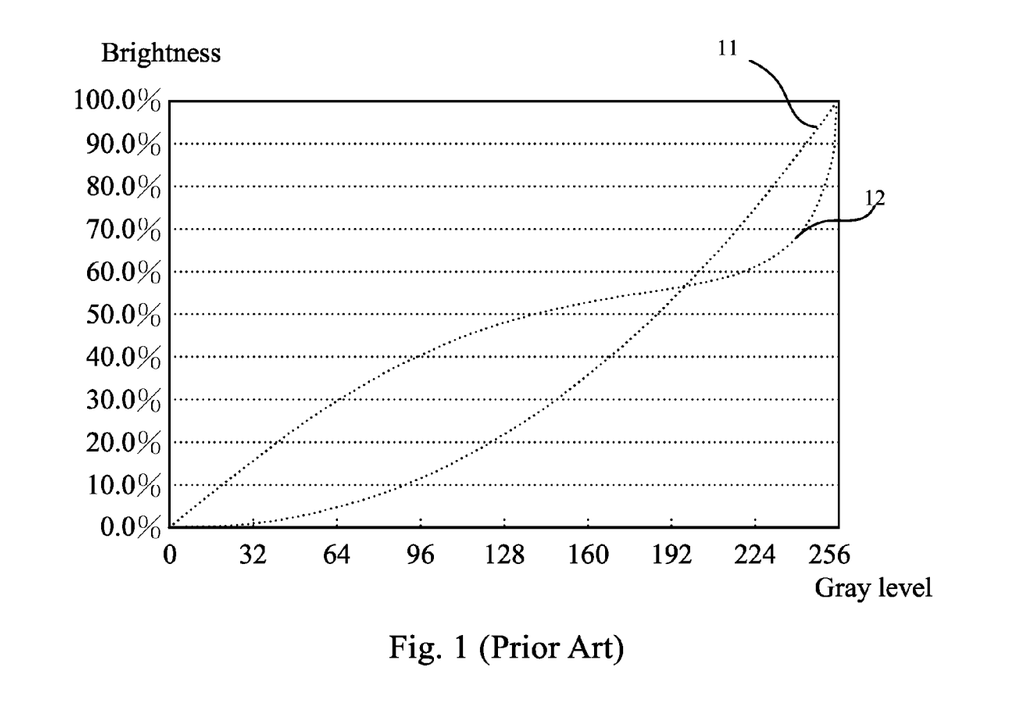
FIG. 1 shows a relationship diagram of the brightness and gray levels when a user sees images shown on the curved screen from a front view and from a side view.

However, a thin film transistor liquid crystal display (TFT-LCD) panel used as a curved screen has shortcomings and needs improvement. Please refer to FIG. 1 showing a relationship diagram of the brightness and gray levels when a user sees images shown on the curved screen from a front view and from a side view. From the front view, a gray level-curve line 11 displayed for the gray levels and brightness is a standard Gamma 2.2 curve line. From the side view, a gray level-curve line 12 displayed for the gray levels and brightness deviates from the standard Gamma 2.2 curve line. As a result, the viewer gets distorted colors displayed on the curved screen from the side view.

Figure 2:
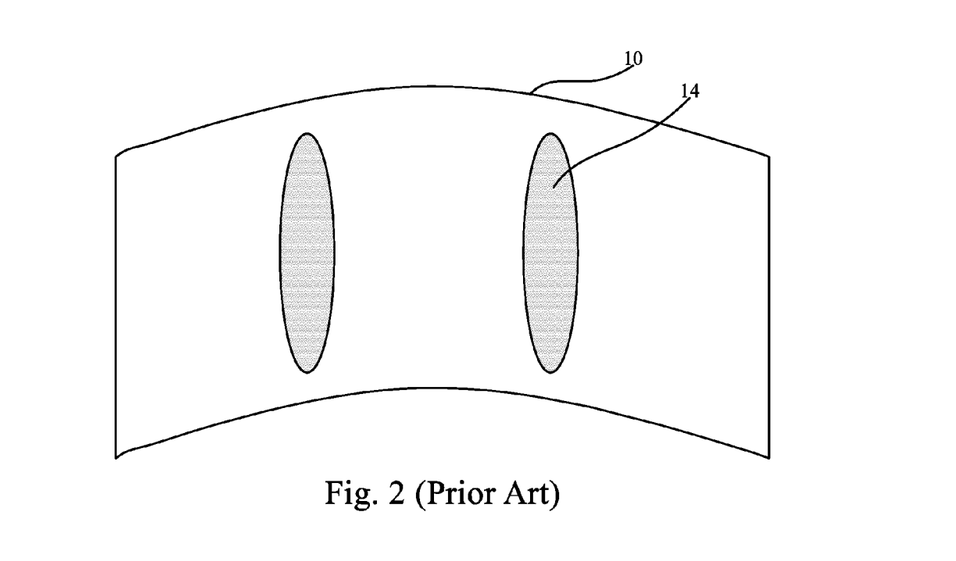
FIG. 2 shows a schematic diagram of dark region located on a curved screen.

Please refer to FIG. 2 showing a schematic diagram of dark region located on a curved screen 10. The curved screen 10 is a TFT-LCD panel. The manufacturing method for the curved screen 10 is the same as that for a flat screen while a module for the curved screen 10 is totally bent for forming the curved screen 10 in the end. But a dark region 14 is generated at the bending area of the curved screen 10. A misalignment occurs between a TFT substrate and a color filter substrate after the curved screen 10 is bent. The range of the misalignment depends on a bent angle formed by the bent area. The larger the bent angle is, the more obvious the misalignment becomes. The misalignment section results in low light transmittance and the dark region 14 is formed. In general, the brightness of the dark region 14 is 60% to 80% of the brightness of the central point of the curved screen 10.

The dark region causes luminance inequality of images for a user. It means that the display quality of the curved screen 10 is lowered.

SUMMARY OF THE INVENTION

Therefore, an object of the present invention is to solve the main problems of the convention technology by reducing the dark region on the curved screen because of misalignment of the TFT substrate and the CF substrate and improving luminance inequality of images due to the misalignment.

According to the present invention, a liquid crystal display (LCD) panel for a curved screen is provided. The LCD panel comprises a plurality of display sections and a black matrix layer. Each of the plurality of display sections comprises a plurality of pixel units. Each of the plurality of pixel units comprises a primary sub-pixel and a secondary sub-pixel. The plurality of display sections comprise a central display section located on a medial area of the LCD panel, a first display section, and a second display section. The first display section is located between the second display section and the central display section. The black matrix layer is used for adjusting an area of the primary sub-pixel and an area of the secondary sub-pixel in each of the plurality of display sections, so that an area ratio of the secondary sub-pixel to the primary sub-pixel in the first display section equals to an area ratio of the secondary sub-pixel to the primary sub-pixel in the central display section, an area ratio of the secondary sub-pixel to the primary sub-pixel in the second display section is greater than the area ratio of the secondary sub-pixel to the primary sub-pixel in the first display section, an area of the primary sub-pixel in the central display section is lower than an area of the primary sub-pixel in the first display section, but the area of the primary sub-pixel in the central display section is greater than an area of the primary sub-pixel in the second display section.

In one aspect of the present invention, the area ratio of the secondary sub-pixel to the primary sub-pixel in the first display section is between 1.1-1.3.

In another aspect of the present invention, the area ratio of the secondary sub-pixel to the primary sub-pixel in the first display section is between 1.2.

In another aspect of the present invention, a ratio of the primary sub-pixel in the central display section to the primary sub-pixel in the first display section is 0.7.

In another aspect of the present invention, the area ratio of the secondary sub-pixel to the primary sub-pixel in the second display section is between 1.5.

In another aspect of the present invention, a ratio of the primary sub-pixel in the second display section to the primary sub-pixel in the first display section is 0.66.

In another aspect of the present invention, the first display section is shaped as an oval.

In another aspect of the present invention, the plurality of display sections further comprise a plurality of first transitional display sections. The plurality of first transitional display sections surround the first display section sequentially. An area of the secondary sub-pixel in each of the plurality of first transitional display sections is between the area of the secondary sub-pixel in the first display section and the area of the secondary sub-pixel in the central display section. An area of the primary sub-pixel in each of the plurality of first transitional display sections is between the area of the primary sub-pixel in the first display section and the area of the primary sub-pixel in the central display section. Both of the area of the secondary sub-pixel and the area of the primary sub-pixel in each of the plurality of first transitional display sections decrease from the inside out proportionally.

In still another aspect of the present invention, the plurality of display sections further comprise a plurality of second transitional display sections. The plurality of second transitional display sections are disposed between the first display section and the second display section. An area of the secondary sub-pixel in each of the plurality of second transitional display sections is between the area of the secondary sub-pixel in the first display section and the area of the secondary sub-pixel in the second display section. An area of the primary sub-pixel in each of the plurality of first transitional display sections is between the area of the primary sub-pixel in the first display section and the area of the primary sub-pixel in the second display section. Both of the area of the secondary sub-pixel and the area of the primary sub-pixel in each of the plurality of second transitional display sections decrease from one side of the first display section to one side of the second display section proportionally.

In yet another aspect of the present invention, the first display section is located at a section of the LCD panel, and the section is bent at the largest angle.

An object of the present invention is to provide an LCD panel applied to curved screens. The areas of the primary sub-pixel and the secondary sub-pixel are adjusted by using the black matrix layer. In this way, the brightness of the curved screen on display is improved. The quality of the curved screen on image display is improved as well.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 3:
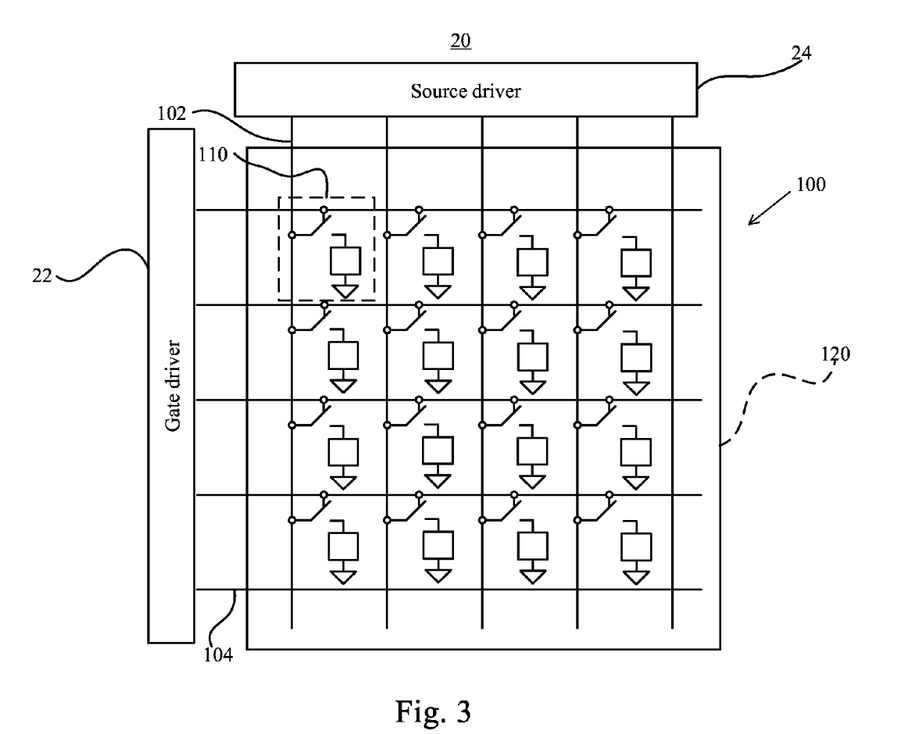
FIG. 3 is a schematic diagram showing an LCD panel used for a display device according to an embodiment of the present invention.
Figure 4:
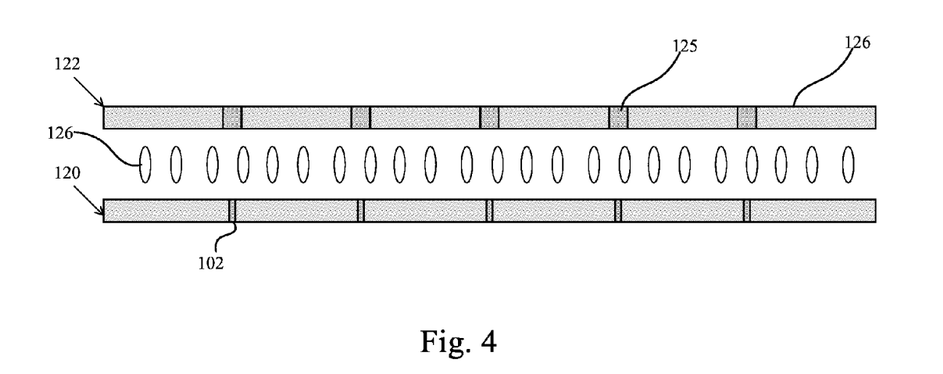
FIG. 4 is a cross-section view showing the LCD panel.

Please refer to FIG. 3 and FIG. 4. FIG. 3 is a schematic diagram showing an LCD panel 100 used for a display device 20 according to an embodiment of the present invention. FIG. 4 is a cross-section diagram showing the LCD panel 100. The display device 20 comprises a gate driver 22, a source driver 24, and the LCD panel 100. The LCD panel 100 is used for a curved screen. The LCD panel 100 comprises a TFT substrate 120, a color filter (CF) substrate 122, and a liquid crystal layer 126. The liquid crystal layer 126 is disposed between the TFT substrate 120 and the CF substrate 122. The CF substrate 122 comprises a black matrix layer 125 and a color film layer 126. The LCD panel 100 separates three primary lights—red, green, and blue—through the color film layer 126 for showing colorful images. The black matrix layer 125 is used for preventing light leaks. The TFT substrate 120 comprises a plurality of data lines 102, a plurality of scan lines 104, and a plurality of pixel units 110.

Figure 5:
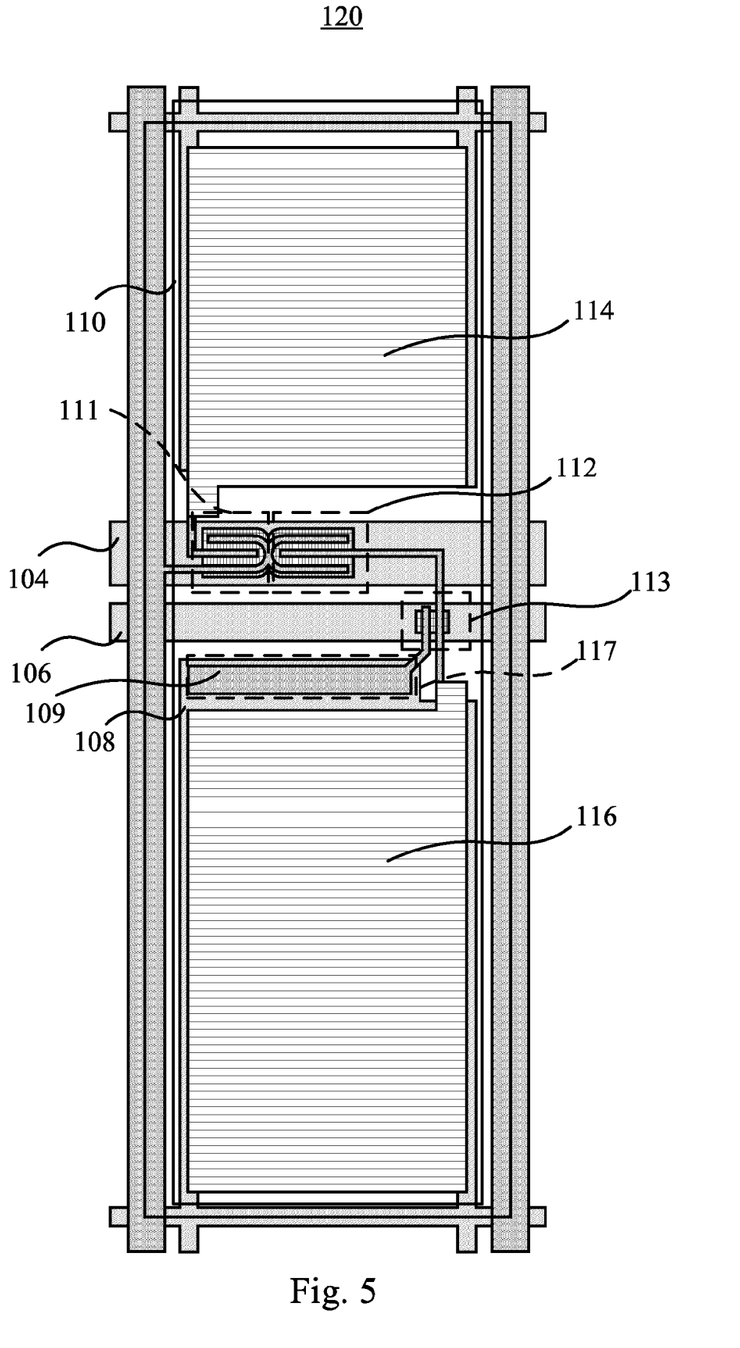
FIG. 5 is a top view showing a pixel according to the embodiment of the present invention.

Please refer to FIG. 5. FIG. 5 is a top view showing a pixel unit 110. The TFT substrate 120 also comprises a plurality of voltage control lines 106 and a plurality of common electrodes 108. Each of the plurality of pixel units 110 is electrically connected to a data line 102, a scan line 104, a voltage control line 106, and to a common electrode 108. Each of the plurality of pixel units 110 comprises a first transistor 111, a second transistor 112, a third transistor 113, a storage capacitor 117, a primary sub-pixel 114, and a secondary sub-pixel 116. FIG. 5 shows a pixel unit 110 for simpleness since the connection of one pixel unit 110 is the same as that of every other pixel unit 110. As FIG. 5 shows, a gate of the first transistor 111 is coupled to the scan line 104. A source of the first transistor 111 is coupled to the data line 102. A drain of the first transistor 111 is coupled to the primary sub-pixel 114. A gate of the second transistor 112 is coupled to the scan line 104. A source of the second transistor 112 is coupled to the data line 102. A drain of the second transistor 112 is coupled to the secondary sub-pixel 116. A gate of the third transistor 113 is coupled to the voltage control line 106. A source of the third transistor 113 is coupled to the drain of the second transistor 112 and to the secondary sub-pixel 116. A drain of the third transistor 113 is coupled to the storage capacitor 117. The voltage control line 106 is used for supplying a control signal.

A driving method for the LCD panel 100 is as follows. A scan signal output by the gate driver 22 is input through the scan line 104, and the first transistor 111 and the second transistor 112 connected to the scan line 104 are turned on sequentially. Meanwhile, the source driver 24 outputs a corresponding data signal to the first transistor 111 and the second transistor 112 through the data line 102. The first transistor 111 and the second transistor 112 transmit the data signal to the primary sub-pixel 114 and the secondary sub-pixel 116 so that the primary sub-pixel 114 and the secondary sub-pixel 116 can obtain necessary voltage. Liquid crystal molecules disposed above the primary sub-pixel 114 and the secondary sub-pixel 116 twist according to a voltage drop of the voltage on the data signal and the common voltage on the common electrode 108. Further, different gray levels are shown. In the meanwhile, the brightness of the primary sub-pixel 114 and the brightness of the secondary sub-pixel 116 are the same. The transistor 111 and the second transistor 112 are turned off when no data signal is transmitted through the scan line 104. At this time, the control signal through the voltage control line 106 turns on the third transistor 113, which makes the voltage on the secondary sub-pixel 116 decrease because the storage capacitor 117 shares the voltage. Meanwhile, the brightness of the secondary sub-pixel 116 is lower than that of the primary sub-pixel 114. The gate driver outputs the scan signal through the plurality of scan lines 104 row by row to turn on the transistor 111 and the second transistor 112 on each row, and then the source driver charges and discharges the primary sub-pixel 114 and the secondary sub-pixel 116 on each row. The process repeats, and finally, the LCD panel 100 displays full images. By revising the difference between the brightness of the secondary sub-pixel 116 and the brightness of the primary sub-pixel 114, the color shift based on users' vision is improved.

Figure 6:
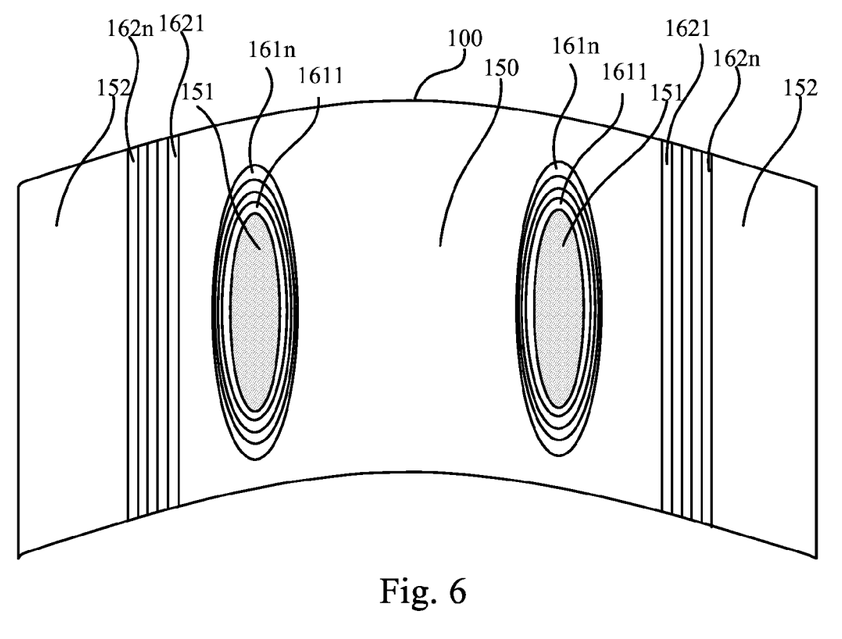
FIG. 6 is a schematic diagram showing different display sections planned on the display panel applied to the curved screen in the present invention.

Please refer to FIG. 6. FIG. 6 is a schematic diagram showing different display sections planned on the display panel 100 applied to the curved screen in the present invention. The LCD panel 100 comprises a central display section 150, a first display section 151, a plurality of first transitional display sections 1611~161n, a second display section 152, and a plurality of second transitional display sections 1621~162n. The central display section 150 is located in the medial area of the LCD panel 100. The first display section 151 is located between the second display section 152 and the central display section 150. The first display section 151 is located in a section of the LCD panel 100, and the section is bent at the largest angle. The first display section 151 appears roughly oval. The second display section 152 is located at both terminals of the LCD panel 100. The width of the second display section 152 is roughly one-eighth to one-twelfth the width of the LCD panel 100.

Figure 7:
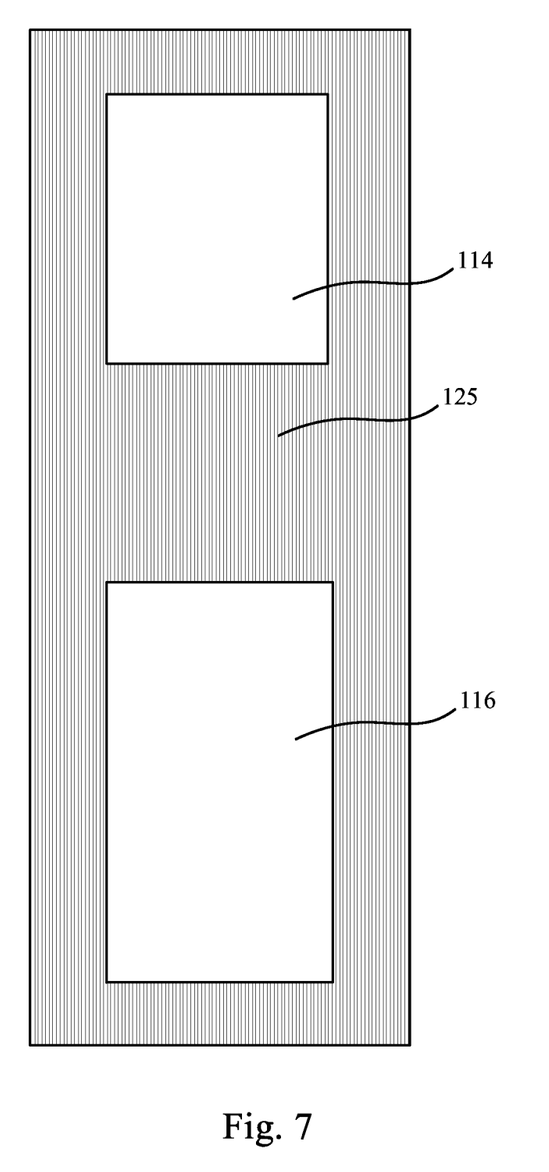
FIG. 7 is a schematic diagram showing the area of the primary sub-pixel and the area of the secondary sub-pixel in the pixel unit through adjustment of the area of the black matrix layer in the pixel.

Please refer to FIG. 4, FIG. 6 and FIG. 7. FIG. 7 is a schematic diagram showing the area of the primary sub-pixel 114 and the area of the secondary sub-pixel 116 in the pixel unit 110 through adjustment of the area of the black matrix layer 125 in the pixel unit 110. In the present invention, the area of the primary sub-pixel 114 in each of the display sections and the area of the secondary sub-pixel 116 in each of the display sections are adjusted by controlling the area of the black matrix layer 125. In the present embodiment, the ratio of the area of the secondary sub-pixel 116 in the first display section 151 to the area of the primary sub-pixel 114 in the first display section 151 is the ratio of the area of the secondary sub-pixel 116 in the central display section 150 to the area of the primary sub-pixel 114 in the central display section 150. The ratio of the area of the secondary sub-pixel 116 in the second display section 152 to the area of the primary sub-pixel 114 in the second display section 152 is larger than the ratio of the area of the secondary sub-pixel 116 in the first display section 151 to the area of the primary sub-pixel 114 in the first display section 151. The area of the primary sub-pixel 114 in the central display section 150 is smaller than the area of the primary sub-pixel 114 in the first display section 151 and is larger than the area of the primary sub-pixel 114 in the second display section 152.

For example, the ratio of the area of the secondary sub-pixel 116 in the first display section 151 to the area of the primary sub-pixel 114 in the first display section 151 is between 1.1 and 1.3. Preferably, the ratio of the area of the secondary sub-pixel 116 in the first display section 151 to the area of the primary sub-pixel 114 in the first display section 151 is 1.2. The ratio of the area of the primary sub-pixel 114 in the central display section 150 to the area of the primary sub-pixel 114 in the first display section 151 is 0.7. The ratio of the area of the secondary sub-pixel 116 in the second display section 152 to the area of the primary sub-pixel 114 in the second display section 152 is 1.5. The ratio of the area of the primary sub-pixel 114 in the second display section 152 to the area of the primary sub-pixel 114 in the first display section 151 is 0.66.

The above-mentioned data tells that the ratio of the area of the secondary sub-pixel 116 in the first display section 151 to the area of the primary sub-pixel 114 in the first display section 151 is the same as the ratio of the area of the secondary sub-pixel 116 in the central display section 150 to the area of the primary sub-pixel 114 in the central display section 150. But the area of the primary sub-pixel 114 and the area of the secondary sub-pixel 116 in the central display section 150 both take zero point seven (0.7) of both of the area of the primary sub-pixel 114 and the area of the secondary sub-pixel 116 in the first display section 151. So the color shift of the first display section 151 is the same as the color shift of the central display section 150. The brightness of the first display section 151 is the same as the brightness of the central display section 150 as well.

The area of the primary sub-pixel 114 in the second display section 152 is smaller than the area of the primary sub-pixel 114 in the central display section 150. The area of the secondary sub-pixel 116 in the second display section 152 is larger than the area of the secondary sub-pixel 116 in the central display section 150. Thus, the brightness of the second display section 152 is close to the brightness of the central display section 150. Compared with the ratio of the area of the secondary sub-pixel 116 in the central display section 150 to the area of the primary sub-pixel 114 in the central display section 150, the ratio of the area of the secondary sub-pixel 116 in the second display section 152 to the area of the primary sub-pixel 114 in the second display section 152 is 1.5. (The ratio of the area of the secondary sub-pixel 116 in the central display section 150 to the area of the primary sub-pixel 114 in the central display section 150 is 1.2.) Compared with the central display section 150, the color shift shown by the second display section 152 is improved. Therefore, the differences of the color shift shown by the whole LCD panel decrease as well.

To prevent the display of the first display section 151 is obviously different from the display of the central display section 150, the plurality of first transitional display sections 1611~161n surround the first display section 151 sequentially. The width of the plurality of first transitional display sections 1611~161n is about 5 cm to 20 cm. Each of the plurality of first transitional display sections 1611~161n is roughly shaped as an oval. The area of the secondary sub-pixel 116 in each of the plurality of first transitional display sections 1611~161n is between the area of the secondary sub-pixel 116 in the first display section 151 and the area of the secondary sub-pixel 116 in the central display section 150. The area of the primary sub-pixel 114 in each of the plurality of first transitional display sections 1611~161n is between the area of the primary sub-pixel 114 in the first display section 151 and the area of the primary sub-pixel 114 in the central display section 150. Besides, both of the area of the secondary sub-pixel 116 and the area of the primary sub-pixel 114 in each of the plurality of first transitional display sections 1611~161n decrease from the inside out proportionally. For example, provided that the area of the primary sub-pixel 114 (or the secondary sub-pixel 116) in the first display section 151 is 100, the area of the primary sub-pixel 114 (or the secondary sub-pixel 116) in the central display section 150 is 70, and that ten first transitional display sections exist, the area of the primary sub-pixel 114 (or the secondary sub-pixel 116) in each of the plurality of first transitional display sections 1611~161n is 97, 94, . . . , 73 from the inside out sequentially.

To prevent the display of the first display section 151 is obviously different from the display of the second display section 152, the plurality of second transitional display sections 1621~162n are disposed between the first display section 151 and the second display section 152 in order. The width of the plurality of second transitional display sections 1621~162n is about 5 cm to 20 cm. Each of the plurality of second transitional display sections 1621~162n is roughly shaped as strips. The area of the secondary sub-pixel 116 in each of the plurality of second transitional display sections 1621~162n is between the area of the secondary sub-pixel 116 in the first display section 151 and the area of the secondary sub-pixel 116 in the second display section 152. The area of the primary sub-pixel 114 in each of the plurality of second transitional display sections 1621~162n is between the area of the primary sub-pixel 114 in the first display section 151 and the area of the primary sub-pixel 114 in the second display section 152. Besides, both of the area of the secondary sub-pixel 116 and the area of the primary sub-pixel 114 in each of the plurality of second transitional display sections 1621~162n decrease from one side of the first display section 151 to one side of the second display section 152 proportionally. For example, provided that the area of the primary sub-pixel 114 (or the secondary sub-pixel 116) in the first display section 151 is 100, the area of the primary sub-pixel 114 (or the secondary sub-pixel 116) in second display section 152 is 70, and that ten first transitional display sections exist, the area of the primary sub-pixel 114 (or the secondary sub-pixel 116) in each of the plurality of second transitional display sections 1621~162n is 97, 94, . . . , 73 from one side of the first display section 151 to one side of the second display section 152 sequentially.

Compared with the prior art, the LCD panel for the curved screen comprises three display sections in the present invention. The areas of the primary sub-pixel and the secondary sub-pixel and the area ratio between the primary sub-pixel and the secondary sub-pixel are adjustable depending on the black matrix layer. In this way, the dark region on the curved screen, and the color shift found by the users from a side view are effectively improved.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) panel for a curved screen, comprising a plurality of display sections and a black matrix layer, each of the plurality of display sections comprising a plurality of pixel units, each of the plurality of pixel units comprising a primary sub-pixel and a secondary sub-pixel, the plurality of display sections comprising:
   a central display section, located on a medial area of the LCD panel;
   a first display section;
   a second display section, the first display section located between the second display section and the central display section;
   a plurality of first transitional display sections, surrounding the first display section sequentially; and
   a plurality of second transitional display sections, disposed between the first display section and the second display section;
   wherein the black matrix layer is used for adjusting an area of the primary sub-pixel and an area of the secondary sub-pixel in each of the plurality of display sections, so that an area ratio of the secondary sub-pixel to the primary sub-pixel in the first display section equals to an area ratio of the secondary sub-pixel to the primary sub-pixel in the central display section, an area ratio of the secondary sub-pixel to the primary sub-pixel in the second display section is greater than the area ratio of the secondary sub-pixel to the primary sub-pixel in the first display section, an area of the primary sub-pixel in the central display section is lower than an area of the primary sub-pixel in the first display section, but the area of the primary sub-pixel in the central display section is greater than an area of the primary sub-pixel in the second display section,
   wherein an area of the secondary sub-pixel in each of the plurality of first transitional display sections is between the area of the secondary sub-pixel in the first display section and the area of the secondary sub-pixel in the central display section, an area of the primary sub-pixel in each of the plurality of first transitional display sections is between the area of the primary sub-pixel in the first display section and the area of the primary sub-pixel in the central display section, and both of the area of the secondary sub-pixel and the area of the primary sub-pixel in each of the plurality of first transitional display sections decrease from the inside out proportionally,
   wherein an area of the secondary sub-pixel in each of the plurality of second transitional display sections is between the area of the secondary sub-pixel in the first display section and the area of the secondary sub-pixel in the second display section, an area of the primary sub-pixel in each of the plurality of second transitional display sections is between the area of the primary sub-pixel in the first display section and the area of the primary sub-pixel in the second display section, and both of the area of the secondary sub-pixel and the area of the primary sub-pixel in each of the plurality of second transitional display sections decrease from one side of the first display section to one side of the second display section proportionally.

2. The LCD panel as claimed in claim 1, wherein the area ratio of the secondary sub-pixel to the primary sub-pixel in the first display section is between 1.1-1.3.

3. The LCD panel as claimed in claim 2, wherein the area ratio of the secondary sub-pixel to the primary sub-pixel in the first display section is 1.2.

4. The LCD panel as claimed in claim 1, wherein a ratio of the primary sub-pixel in the central display section to the primary sub-pixel in the first display section is 0.7.

5. The LCD panel as claimed in claim 1, wherein the area ratio of the secondary sub-pixel to the primary sub-pixel in the second display section is 1.5.

6. The LCD panel as claimed in claim 1, wherein a ratio of the primary sub-pixel in the second display section to the primary sub-pixel in the first display section is 0.66.

7. The LCD panel as claimed in claim 1, wherein the first display section is shaped as an oval.

8. The LCD panel as claimed in claim 1, wherein the first display section is located at a section of the LCD panel, and the section is bent at the largest angle.

9. A liquid crystal display (LCD) panel for a curved screen, comprising a plurality of display sections and a black matrix layer, each of the plurality of display sections comprising a plurality of pixel units, each of the plurality of pixel units comprising a primary sub-pixel and a secondary sub-pixel, the plurality of display sections comprising:
   a central display section, located on a medial area of the LCD panel;

a first display section;

a second display section, the first display section located between the second display section and the central display section;

wherein the black matrix layer is used for adjusting an area of the primary sub-pixel and an area of the secondary sub-pixel in each of the plurality of display sections, so that an area ratio of the secondary sub-pixel to the primary sub-pixel in the first display section equals to an area ratio of the secondary sub-pixel to the primary sub-pixel in the central display section, an area ratio of the secondary sub-pixel to the primary sub-pixel in the second display section is greater than the area ratio of the secondary sub-pixel to the primary sub-pixel in the first display section, an area of the primary sub-pixel in the central display section is lower than an area of the primary sub-pixel in the first display section, but the area of the primary sub-pixel in the central display section is greater than an area of the primary sub-pixel in the second display section, and wherein the first display section is located at a section of the LCD panel, and the section is bent at the largest angle.

10. The LCD panel as claimed in claim 9, wherein the area ratio of the secondary sub-pixel to the primary sub-pixel in the first display section is between 1.1-1.3.

11. The LCD panel as claimed in claim 10, wherein the area ratio of the secondary sub-pixel to the primary sub-pixel in the first display section is 1.2.

12. The LCD panel as claimed in claim 9, wherein a ratio of the primary sub-pixel in the central display section to the primary sub-pixel in the first display section is 0.7.

13. The LCD panel as claimed in claim 9, wherein the area ratio of the secondary sub-pixel to the primary sub-pixel in the second display section is 1.5.

14. The LCD panel as claimed in claim 9, wherein a ratio of the primary sub-pixel in the second display section to the primary sub-pixel in the first display section is 0.66.

15. The LCD panel as claimed in claim 9, wherein the first display section is shaped as an oval.

16. The LCD panel as claimed in claim 9, wherein the plurality of display sections further comprise a plurality of first transitional display sections, and the plurality of first transitional display sections surround the first display section sequentially, an area of the secondary sub-pixel in each of the plurality of first transitional display sections is between the area of the secondary sub-pixel in the first display section and the area of the secondary sub-pixel in the central display section, an area of the primary sub-pixel in each of the plurality of first transitional display sections is between the area of the primary sub-pixel in the first display section and the area of the primary sub-pixel in the central display section, and both of the area of the secondary sub-pixel and the area of the primary sub-pixel in each of the plurality of first transitional display sections decrease from the inside out proportionally.

17. The LCD panel as claimed in claim 9, wherein the plurality of display sections further comprise a plurality of second transitional display sections, and the plurality of second transitional display sections are disposed between the first display section and the second display section, an area of the secondary sub-pixel in each of the plurality of second transitional display sections is between the area of the secondary sub-pixel in the first display section and the area of the secondary sub-pixel in the second display section, an area of the primary sub-pixel in each of the plurality of second transitional display sections is between the area of the primary sub-pixel in the first display section and the area of the primary sub-pixel in the second display section, and both of the area of the secondary sub-pixel and the area of the primary sub-pixel in each of the plurality of second transitional display sections decrease from one side of the first display section to one side of the second display section proportionally.

* * * * *